J. RODEFER.
Improvement in Bedstead Fastenings.
No. 4,432. Reissued June 20, 1871.
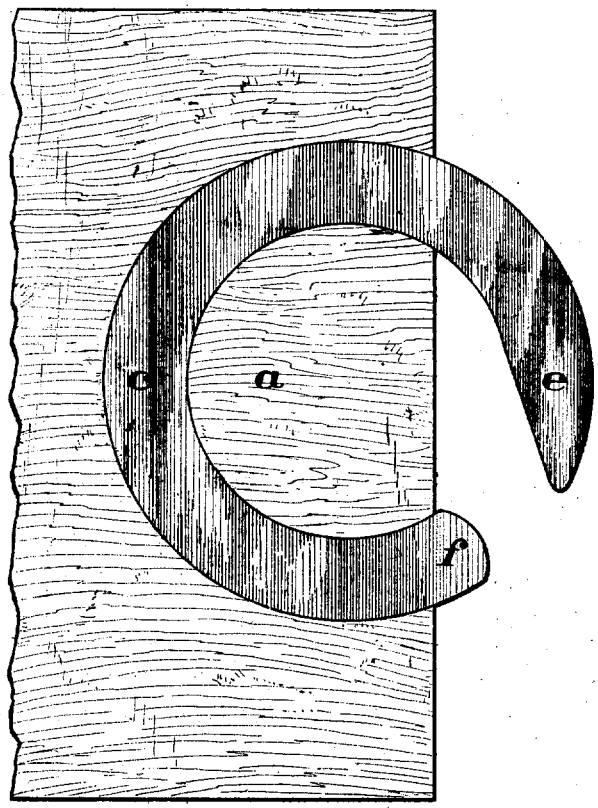
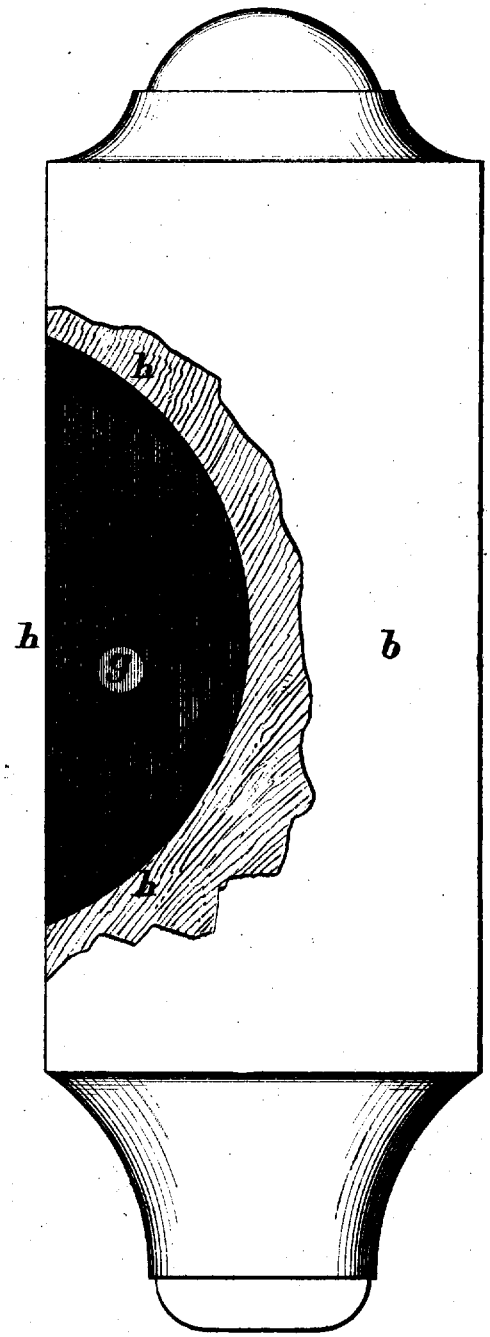
Ann M. Rodefer administratrix of Joseph Rodefer
INVENTOR. (dec'd)
By Knight Bros
Attys.
Attest.
Jas. H. Layman.
John Kilbs.
AM. PHOTO-LITHOGRAPHIC CO. N.Y. (OSBORNE'S PROCESS.)

UNITED STATES PATENT OFFICE.

ANN M. RODEFER, OF HAMILTON COUNTY, ADMINISTRATRIX OF JOSEPH RODEFER, DECEASED, ASSIGNOR TO JAMES L. HAVEN & CO., OF CINCINNATI, OHIO.

IMPROVEMENT IN BEDSTEAD-FASTENINGS.

Specification forming part of Letters Patent No. 12,693, dated April 10, 1855; extended seven years; reissue No. 4,432, dated June 20, 1871.

*To all whom it may concern:*

Be it known that JOSEPH RODEFER, deceased, late of Cincinnati, Hamilton county, Ohio, invented a new and useful Improvement in Bedstead-Fastenings, of which the following is a specification:

*Nature and Objects of the Invention.*

The invention consists in giving the shank, or that portion of the bedstead-fastening by which it is attached to the rail or post, an annular segmental form, adapted to occupy such a corresponding segmental cavity in the rail as can be excavated at a single operation by means of a rotary cutter, thus combining great strength and endurance with simplicity and cheapness of manufacture.

*General Description with Reference to the Drawing.*

The drawing is a side elevation of a male or tenon part or member of a bedstead-fastening embodying said invention.

*a* is a portion of a bedstead-rail, and *b* a post, which latter is shown partly in section. The male or tenon member of the fastening is, in its simplest form, an annular segment, *c*, which is sunk into a corresponding annular groove or cavity in the side of the rail, from whose end the portions *e* and *f* project to form the tenons. One of these portions *e* being hooked, as shown, may engage over a pin, *g*, within the post-mortise *h*, within which the portion *f* also engaging, prevents any turning of the rail in the post. The member *c* may be secured against lateral displacement by a button or otherwise.

Where intended for use in conjunction with a common two-hole mortise-plate both projections may have the same hooked or dovetailed form as the upper one here shown, and may be strengthened by a brace or cord-piece, so as to have the form of the letter D.

While described and chiefly intended for the tenon portion, the device is manifestly applicable for the mortise portion or member of a bedstead-fastener.

*Claim.*

What is claimed as the invention of the said RODEFER is—

A bedstead-fastener, adapted to be held in place by being let into an annular groove on the side of the rail or post, substantially as described.

In testimony of which invention I hereunto set my hand.

ANN M. RODEFER,
*Administratrix of Joseph Rodefer, deceased.*

Witnesses:
GEO. H. KNIGHT,
THOS. MCLEAN.